United States Patent [19]

Nash et al.

[11] Patent Number: 4,615,546
[45] Date of Patent: Oct. 7, 1986

[54] MULTIPLE CONNECTOR FLUID COUPLING

[75] Inventors: Robert W. Nash, Birmingham; Paul R. Andre, Farmington Hills; Dennis F. Knoblock, Rochester, all of Mich.

[73] Assignee: William H. Nash Co., Inc., Farmington Hills, Mich.

[21] Appl. No.: 695,374

[22] Filed: Jan. 28, 1985

[51] Int. Cl.[4] ............................................. F16L 35/00
[52] U.S. Cl. ....................................... 285/26; 285/38; 285/137.1; 285/312; 285/316; 285/920
[58] Field of Search ...................... 285/24, 25, 26, 27, 285/28, 29, 137.1, 920, 312, 316

[56] References Cited

U.S. PATENT DOCUMENTS

| | | | |
|---|---|---|---|
| 6,873 | 11/1849 | Perley . | |
| 1,878,826 | 9/1932 | Cederstrom . | |
| 3,527,480 | 9/1970 | Larson | 285/316 X |
| 3,642,307 | 2/1972 | Brickhouse et al. | 285/38 |
| 4,089,549 | 5/1978 | Vyse et al. | 285/137 R |
| 4,191,256 | 3/1980 | Croy et al. | 285/DIG. 21 |
| 4,394,039 | 7/1983 | Burguier | 285/137 R X |
| 4,426,104 | 1/1984 | Hazelrigg | 285/26 |

Primary Examiner—Dave W. Arola
Attorney, Agent, or Firm—Gifford, Groh, VanOphem, Sheridan, Sprinkle & Dolgorukov

[57] ABSTRACT

A multiple connector fluid coupling includes a plurality of quick-connect fluid couplings and comprises a first plate adapted to support a plurality of male connector parts, a second plate adapted to support a plurality of female connector parts in alignment for registration with the male parts in the first plate, and a third plate adapted to engage displaceable sleeves on the female connector parts to simultaneously activate the sleeves. In one form of the invention, the second and third plates have elongated end portions so that the plates can be manually grasped and manipulated for positioning with respect to the first plate. In another form of the present invention, a manual lever-operated cam displaces the third plate with respect to the second plate so that a mechanical advantage can be provided for operating a plurality of large fluid connectors at one time. In still another form of the present invention, hydraulic or pneumatic cylinders are employed to displace the plates with respect to one another in order to simultaneously operate the individual fluid connector engagement mechanisms.

14 Claims, 7 Drawing Figures

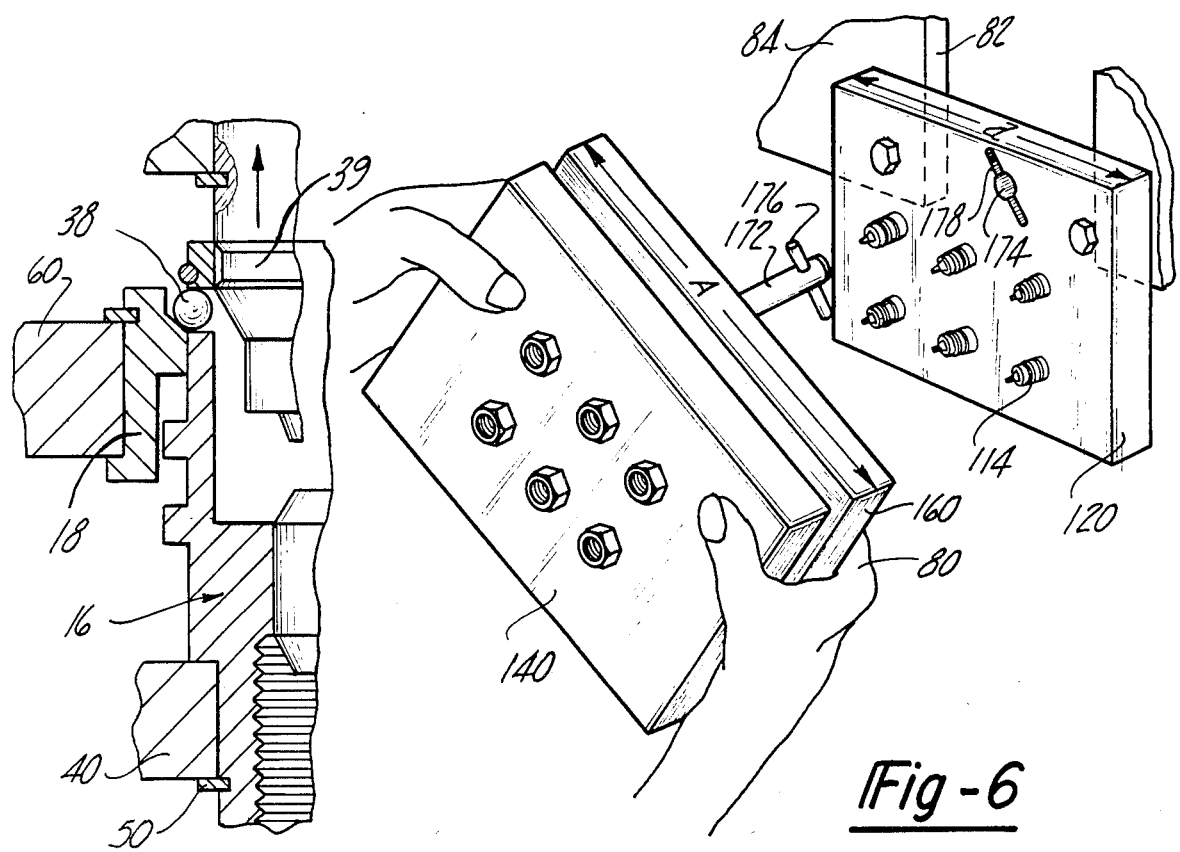
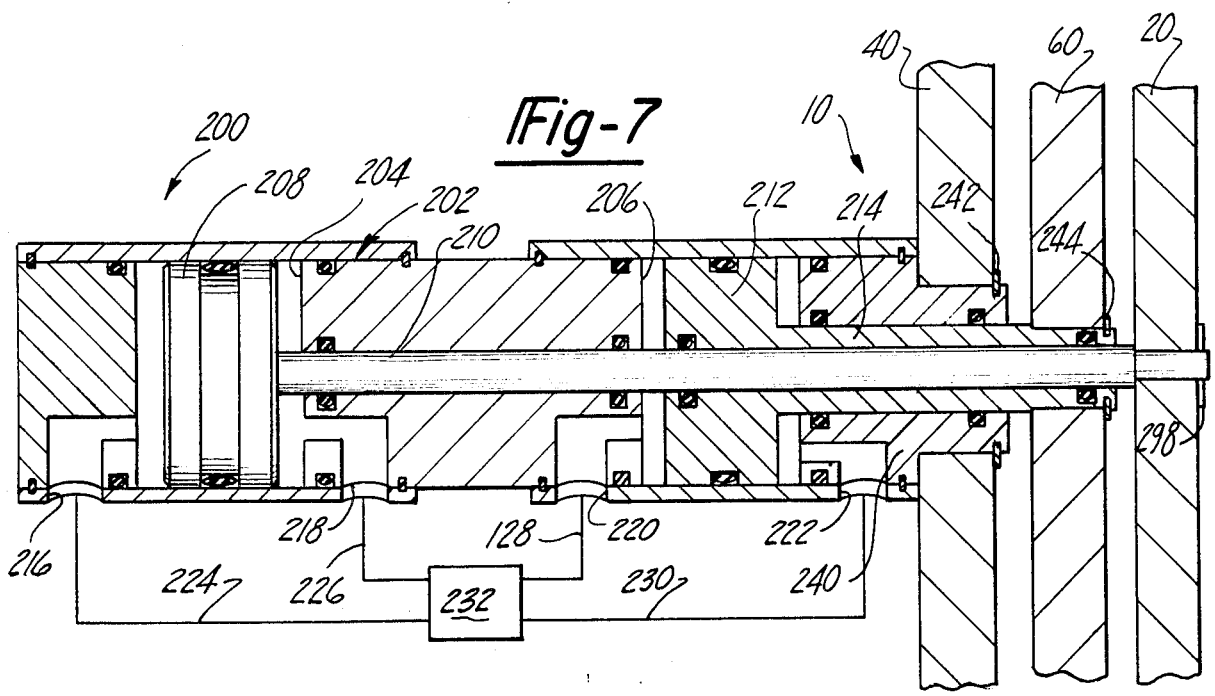

MULTIPLE CONNECTOR FLUID COUPLING

BACKGROUND OF THE INVENTION

I. Field of the Present Invention

The present invention relates generally to fluid couplings and, more particularly, to a fluid coupling having a plurality of separate fluid connectors.

II. Description of the Prior Art

In industrial apparatus, it is often necessary to fluidly connect a plurality of different fluid or gas sources to operating equipment. For example, industrial welding equipment may require an oxygen source, an acetylene source, a water source for cooling the welding head and various other fluids or gases. Each of these sources must be fluidly connected to separate burner jets, fluid conduits or other operational apparatus, and such connections are often made by using a separate hose between each gas or fluid source and the respective operating equipment. Unfortunately, such connections can be time consuming to accomplish, especially since care must be taken to assure that each hose is properly secured to the correct medium source. Incorrect connection of a source to the respective equipment may create fluid or gas losses as well as create serious safety hazards.

In order to overcome the above-mentioned problems, multiple fluid connectors have been employed to properly and correctly connect several fluid and gas sources to respective operating equipment. For example, copending application Ser. No. 431,832, now U.S. Pat. No. 4,494,775, shows a multiple fluid coupling in which a plurality of male connector portions are arranged on a first plate in a pattern adapted to register with a plurality of female connector portions arranged in a pattern on the second plate. External lever means are used to clamp the plates together so that they press the male and female portions together. Other means such as guide pins can be used to assure that the plates can be assembled only in single alignment so that inadvertent cross connection of fluid conduits cannot occur. Unfortunately, it has been found that such external connection means for connecting male and female portions of a plurality of fluid connectors permits variation in the force engaging each separate fluid connector, whereby leakage of pressurized fluid through the connectors can occur, especially in large diameter connectors or high pressure hydraulic systems.

Although there have been previously known fluid connectors which include means for lockingly engaging the individual male and female parts together, it has heretofore been necessary to revert use of a single connection for each fluid coupling. For example, it has been known to use a plurality of quick-disconnect couplings wherein each female portion includes a peripheral sleeve displacably mounted to selectively urge locking members, such as ball bearings, into a recess of a male part and thereby lock the parts together. Although these previously known connectors are known to provide a secure connection between connector parts, it has not previously been possible to connect a plurality of such connectors together in the manner taught in the above discussed application. Moreover, while the system disclosed in the previously filed pending application can be used safely for fluid connections subject to low pressure operation, for example, in the range of 0 to 120 psi, self locking connectors are especially well adapted to be employed in high pressure applications (over 250 psi) for safety reasons as well as locking ability. Moreover, such connectors can be considered critical when pressures in the 2000–3000 psi range are utilized in particular industrial applications. However, as discussed above, such fluid connectors must be individually linked and cannot be employed with the previously known multiple connection clamping devices. In particular, it can be appreciated that the connectors positioned at the center of a multiple connector pattern could not be reached for displacement of the sleeve actuated locking means.

SUMMARY OF THE PRESENT INVENTION

The present invention overcomes the above mentioned disadvantages by providing a means for simultaneously actuating a plurality of individually lockable connectors. Each individual connector includes a female body portion having a displacable sleeve which serves to actuate a locking mechanism in a well known manner, and a male part adapted to be received within the female part. The actuating means generally comprises a first plate adapted to hold the male parts, a second plate adapted to hold the female parts and a third plate adapted to engage the sleeves on the female parts. The present invention also includes both manual means and automatic means for displacing the plates with respect to one another so that the connector portions can be locked together and separated as desired.

The present invention also includes a means for limiting the separation between the plates when the connectors are uncoupled so that even though high pressure lines are communicating with the connectors, the plates cannot be explosively propelled away from each other during connection or disconnection of the connectors. In the preferred embodiment, guide pins are asymetrically offset with respect to the pattern of connectors in the two plates to assure that male parts can be aligned only in registration with the corresponding female part. Moreover, at least one guide pin is elongated so as to extend through and beyond one of the plates and the extended portion includes a transverse bar which can engage the rear of the plate to prevent separation of the plates when the male connector parts are aligned in registration with the female connector parts.

It is to be understood that the present invention is especially useful for large capacity connectors, or for a connector to be employed to high pressure applications. However, a three plate multiple connector coupling according to the present invention can also be utilized with small or low pressure connectors to provide an easily manipulated and substantially less cumbersome coupling than previously known multiple connector couplings. However, when the couplings are used in high pressure or large capacity applications, a unique lever operator can be used to apply sufficient force to simultaneously disengage the locking mechanism in each individual connector so that the male parts can be withdrawn from the female parts. Nevertheless, it will be understood that other means such as working cylinders can be used to displace the plates relative to one another automatically so that simultaneous connection of the connector parts can be performed in the proper sequence.

BRIEF DESCRIPTION OF THE DRAWING

The present invention will be more clearly understood by reference to the following detailed description of a preferred embodiment when read in conjunction with the accompanying drawing, in which like reference characters refer to like parts throughout the views and in which:

FIG. 5 is a fragmentary sectional view of the apparatus shown in FIG. 4 but showing the assembly in a second operational position;

FIG. 6 is perspective view of a manually operable apparatus according to the present invention and;

FIG. 7 is a sectional view of an automatically operable apparatus according to the present invention.

DETAILED DESCRIPTION OF A PREFERRED EMBODIMENT OF THE PRESENT INVENTION

Figure 1:
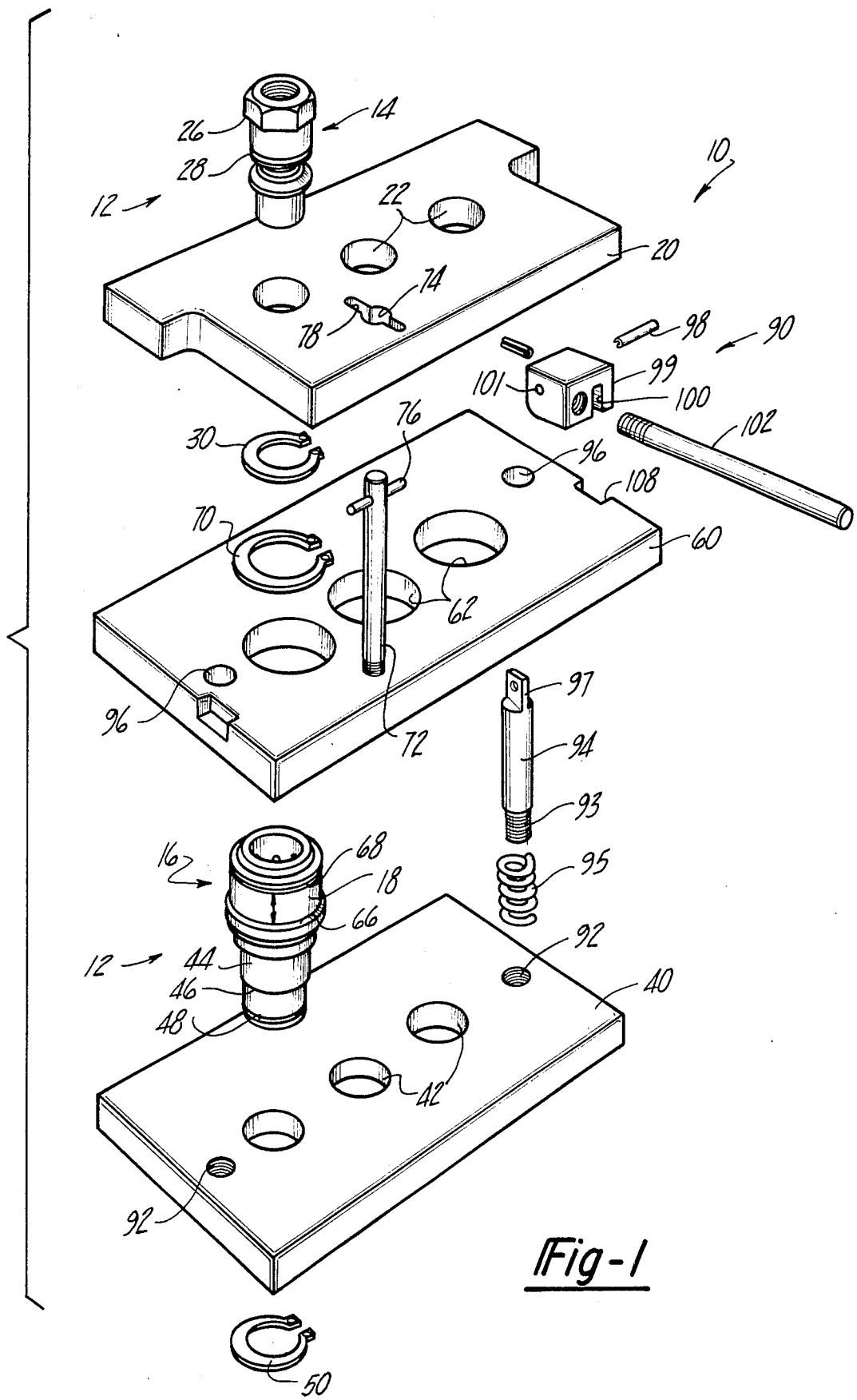
FIG. 1 is an exploded perspective view of a multiple connector fluid coupling apparatus according to the present invention with some parts removed for the sake of clarity.

Referring first to FIG. 1, the multiple connector fluid coupling 10 according to the present invention is thereshown comprising a plurality of fluid connectors 12 (one shown in FIG. 1), each connector comprising a male part 14 and a female part 16. The female part 16 includes an external sleeve 18 which is slidably displaceable along the female part 16 in a well known manner as will be described in greater detail hereinafter. A first plate 20 includes a plurality of apertures adapted to receive the body of a male connector part 14 therethrough. An enlarged annular ridge 26 and a spaced apart locking ring groove 28 adapted to receive a locking ring 30 are used to lockingly secure the male part 14 to the first plate 20.

A second plate 40 includes apertures 42 adapted to axially register with apertures 22 in the plate 20. Apertures 42 are adapted to receive the body of a female part 16 therethrough. Each female part 16 includes an enlarged diameter portion 44 forming a ridge 46 spaced apart from a ring groove 48 adapted to receive a locking ring 50 to lockingly secure each female part 16 within the plate 40.

In addition, a third plate 60 includes apertures 62 aligned to coaxially register with apertures 22 and 42 in the plates 20 and 40 respectively. Each of the apertures 62 is adapted to receive a sleeve 18 therethrough, and the sleeve includes an enlarged rim edge 66 spaced apart from a receiving groove 68 adapted to receive the locking ring 70. Each sleeve 18 is entrained in an aperture 62 of plate 60.

Since the sleeve 18 is displaceably entrained on female part 16, it will be understood that plates 40 and 60 are locked together even though relatively displaceable with respect to one another as the sleeve 18 moves along the enlarged portion 44 of the female part 16. In addition, the plate 20 can be displaceably secured to the plates 40 and 60 by means for limiting displacement of the plate 20 with respect to the plate 60. As shown in FIG. 1, a guide pin 72 is threadably engaged in an aperture of the plate 62 and extends toward the plate 20. The plate 20 includes a guide pin bore 24 adapted to receive the body of the guide pin 70 therethrough. The upper end of the guide pin 72 includes a transverse bar 76 substantially longer than the diameter of the bore 74. Moreover, the plate 20 also includes an elongated slot 78 intersecting the bore 74, and the slot 78 is angularly misaligned with respect to the position of the transverse bar 76 when the apertures 22 in plate 20 are coaxially aligned with the apertures 62 in plate 60. As a result, the guide pin 72 provides blow-back protection and prevents the plate 20 from separating from the plates 40 and 60. Moreover, it can be seen that the connector 72 is offset from the center of the pattern of apertures 62 so that the male parts 14 cannot be incorrectly aligned with mismatched female parts 16 when plates carrying the parts 14 and 16 are aligned for interconnection.

Figure 4:
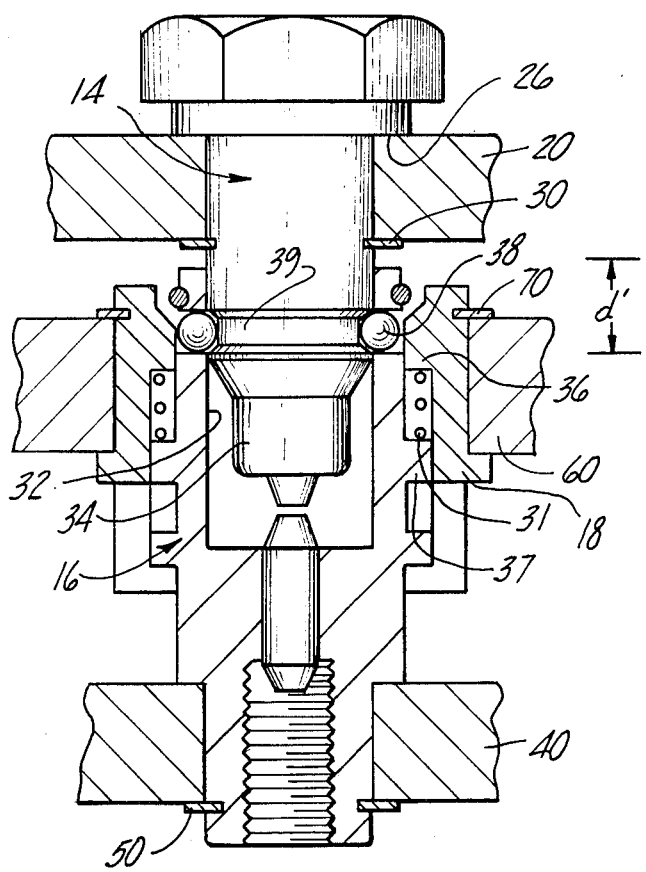
FIG. 4 is an enlarged, fragmentary sectional view of a fully coupled assembly according to the present invention.

Referring now to FIG. 4, the connection of plates 20, 40 and 60 and connector parts 14 and 16 are shown in greater detail. The construction of these connectors 12 is well known but is discussed in detail briefly for the sake of clarifying the structure and operation of the multiple connector fluid coupling of the present invention. As shown in FIG. 4, the sleeve 18 is resiliently biased by coil spring 31 toward the end of the female part 16 having the open ended chamber 32 adapted to receive the male end 34 of the connector part 14. The spring 31 is engaged between the inwardly extending lip 36 on the sleeve 18 and the outwardly extending flange 37 of the female connector part 16. In this position, the lip 36 also urges connector balls 38 inwardly so that they can engage within a peripheral groove 39 in the body of male connector part 14. In this manner, the male part 14 is fixedly secured to female connector part 16 so that pressurized fluid and gas can flow through the connector 12.

Referring now to FIG. 5, the male part 14 can be released from female part 16 by sliding the sleeve 18 down along the body of the female part 16 away from the open end adapted to receive male connecter part 14. This lowers the lip 36 below the position of the bearings 38 so that the bearings 38 are free to move radially outwardly from the groove 39 within the sockets formed in the body of the female connector 16. Since the ball bearings 38 are no longer tightly engaged within the groove 39, male end 34 of connecter part 14 can be slid out of the opening 32 of the female part 16 whereby the connector 12 is uncoupled. As also shown in FIG. 5, when the sleeve 18 is secured to plate 60 in the manner previously discussed, and the female part 16 is secured to the plate 40, displacement of the plate 60 toward the plate 40 activates the disengagement mechanism of the connector 12 discussed above.

One means for displacing the plate 60 with respect to the plate 40 is shown in FIG. 6. When a small number of relatively small connectors 12 must be connected, a useful means for manually coupling the multiple connector fluid coupling comprises extended portions of connector plates 160 and 140. In FIG. 6, each plate 140 and 160 has a length substantially longer than the length of the plate 120. As a result, the fingers 80 of an operator can be wrapped around the edges of the plates 140 and 160 to position and align the female connector parts 116 held in the plates 140 and 160 with male parts 114 carried by the plate 120. Moreover, as shown in FIG. 6, plate 120 is mounted to a face plate opening 82 in a machine support structure 84, and the narrower width of the plate 120 provides sufficient clearance for the operator's fingers 80 when the female parts 116 are coupled to the male parts 114. Moreover, the extended end portions not only contribute to ease in simultaneously displacing sleeves 118 on the female members 116 by permitting the plates 140 and 160 to be squeezed together by hand, but they facilitate positioning and alignment of the female parts 116 with respect to the male parts 14 held by the mounted plate 120.

As also shown in FIG. 6, a transverse bar 176 and guide pin 172 can be aligned with elongated slot 178 in the plate 120 before the plates 140 and 160 are rotated so that female members 116 are aligned with the corresponding male parts 114. However, it will be understood that when all of the male parts 114 are aligned with the female parts 116, the transverse bar 176 is aligned at an angle to the elongated slot 178 and thereby limits separation between the plates 160 and 140 and the plate 120. As a result, plates 140 and 160 cannot be pulled free from the support structure 84 in the event that high pressure fluid or gas has been applied to one of the parts of the connectors 12 when the connector parts are being coupled or uncoupled together.

Figure 2:
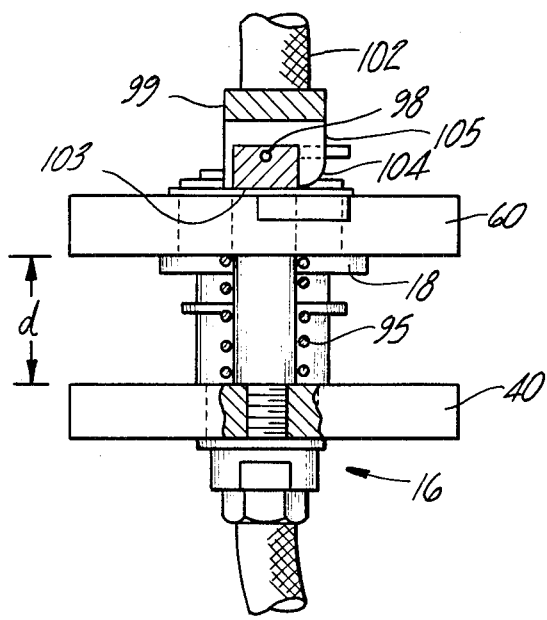
FIG. 2 is a partial sectional view of a portion of the device shown in FIG. 1 assembled in a first operative position.
Figure 3:
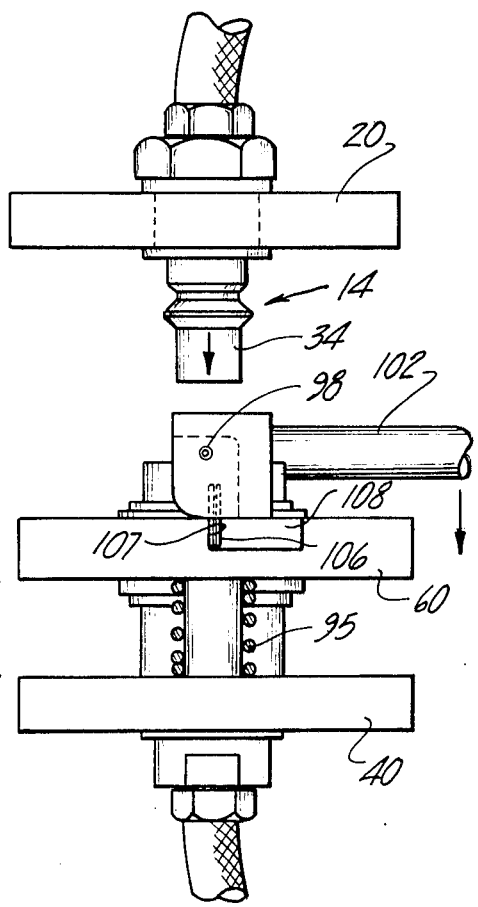
FIG. 3 is an end view of the portion shown in FIG. 2 in a second operational position.

Referring now to FIGS. 1–3, another means for displacing the plate 60 with respect to the plate 40 is thereshown comprising a lever operated cam mechanism 90. The plate 40 includes a pair of apertures 92, one aperture at each end of the plate adapted to receive a threaded end 93 of guide rod 94 (one shown). A coil spring 95 is slidably received over the body of the guide pin 94. The plate 60 includes a pair of apertures 96, one at each end of the plate, so as to be aligned with the pair of apertures 92 in plate 40. The apertures 96 are adapted to slidably receive the body of the guide pins 94 therethrough so that the plate 60 rests against the end of the coil spring 95. The spring 95 supplements the force of the springs 31 so that the weight of the plate 60 does not excessively stress the springs 31 and cause premature uncoupling of the connectors 12.

The upper end of the guide pin 94 comprises a flat flange 97 having an aperture adapted to pivotally receive a pivot pin 98 therethrough. A cam block 99 includes a slot 100 adapted to receive the flange 97 therein and the block 99 includes a pivot pin support apertures 101 which register with the pivot aperture in the flange 97 so that the cam block 99 pivots about the axis of the pin 98. An elongated handle 102 is threadably engaged within the cam block 99.

As best shown in FIG. 2 with the handle 102 in an upright position, the first cam surface 103 engages the top of the plate 60, and the plate 60 is at its uppermost position with respect to the plate 40 due to the action of the springs 31 and 95. A second cam surface 105 is spaced apart from the pivot pin 98 a distance greater than the distance between pivot pin 98 and the cam surface 103 by an amount which is substantially equal to the distance travelled by the sleeve 18 along the body of the female connector part 16. Preferably, the first cam surface 103 cnnects with the second cam surface 105 by a radiused edge portion 104 of the block 99. Thus, when the lever 102 is pivoted downwardly to the position shown in FIG. 3, the cam block 99 urges the plate 60 downwardly toward the plate 40 and thus simultaneously slides all sleeves 18 along the bodies of the female connector parts 16.

An abutment pin 106 engages the edge 107 of the recess 108 formed in the edge of the plate 60 to prevent excess pivoting of the lever 102 to avoid damage to the connector part 16. Cut outs in the plate 20 permit the handle 102 to be freely pivoted about pivot pin 98, whereby the handle 102 can be made long enough to provide a substantial amount of leverage. In any event, it will be understood that when the lever 102 is positioned as shown in FIG. 3 so that the cam surface 105 presses the plate 60 toward the plate 40, all of the male connector parts 14 held by the plate 20 can be freely inserted into and withdrawn from the corresponding female connector parts 16.

Referring now to FIG. 7, the lever operated cam mechanism 90 can be replaced by means for automatically displacing the plates 20, 40 and 60 with respect to each other in the manner discussed above. Such a construction is especially advantageous when extremely high pressures are applied to the connectors and the substantial risk of injury due to gas or fluid losses or pressure releases would be detrimental to personnel operating the equipment. Moreover, where a large number of connectors 12 must be simultaneously activated, the force necessary to simultaneously activate the connectors may require that high-powered working cylinders, such as hydraulic cylinders or pneumatic cylinders, be used to connect and disconnect the fluid coupling 10. As shown in FIG. 7, a single axis dual piston cylinder 200 provides an especially compact and effective means for relatively displacing the plates.

The cylinder 200 includes a housing generally designated at 202 defining a first piston chamber 204 and a spaced apart but axially aligned piston chamber 206. A piston 208 is slidably disposed within the first chamber 204 and includes an elongated piston rod 210. A second piston 212 is displaceably entrained in the piston chamber 206 and includes a tubular piston rod 214. Both the piston 212 and the piston rod 214 include throughbores adapted to receive the piston rod 210 therethrough. Thus, the piston rods 210 and 214 extend outwardly from the same end of the housing.

The housing 202 also includes fluid port 216 communicating with chamber 204 on one side of the piston 208 while a port 218 communicates with the chamber 204 on the other side of the piston 208. Similarly, the fluid port 220 communicates with the piston chamber 206 on one side of the piston 212 while a fluid port 222 communicates with the piston chamber 206 in the other side of the piston 212. These ports are fluidly coupled by appropriate means such as fluid lines 224, 226, 228 and 230 respectively, to a fluid control means designated diagramatically at 232. The control 232 can be a manually operated control or an automatically sequenced control which provides a working medium such as a pressurized fluid or gas to the ports 216 through 222 for connection and disconnection of the plates as desired. A more detailed discussion of the above cylinder 200 is contained in copending patent application Ser. No. 695,383 although the above summary is provided to clarify the operation of the cylinder in combination with the present invention.

As shown in FIG. 7, housing 202 is fixedly secured with respect to the plate 40 by securing both the housing and the plate with respect to a machine supporting structure, or alternatively, by directly securing end cap 240 of the housing 202 to the plate 40. As shown in FIG. 7, the end portion of the end cap 240 is received within an aperture in the plate 40 and locked in position by a locking ring 242. The piston rod 214 extends through the end cap 240 and includes a reduced diameter portion to fit within an aperture in the plate 60. The plate 60 can be locked to the piston rod 214 by a locking ring 244 as is shown in FIG. 7. Furthermore, the piston rod 210 includes a reduced diameter portion adapted to be received in an aperture in the end plate 20, and includes a transverse throughbore through which a locking pin 248 is inserted to secure the plate 20 with respect to the piston rod 210.

The operation of the automatic actuating means as discussed above can be readily described. Whenever engagement or disengagement of the male connector parts 14 with the female connector parts 16 is required, fluid is directed into the port 222 so that the piston 212 and piston pin 214 urge the plate 60 toward the plate 40 which is secured with respect to the housing 202. While pressure continues to be applied to port 222 by control means 232, fluid is also supplied to port 218 or port 216 so that the male parts mounted in plate 20 are inserted into or extracted from, respectively, the corresponding female connectors parts 16 in plate 40. Fluid is then introduced into the port 220 and exhausted from the port 222 so that the female connector parts 16 are lockingly engaged with the male connector parts 14.

Having thus described the important features of the preferred embodiment of the present invention, many modifications thereto will become apparent to those skilled in the art to which it pertains without departing from the scope and spirit of the present invention as defind in the appended claims.

What is claimed is:

1. A fluid coupling comprising:
   a plurality of fluid connectors, each connector comprising a male part and a female part and means for selectively coupling said male part to said female part, said means for selectively coupling comprising a sleeve mounted for axial displacement along each of said female members; and
   means for simultaneously displacing said sleeves comprising a first plate and means for securing said male parts to said first plate, a second plate and means for securing said female parts to said second plate for registration with said male parts in said first plate, a third plate and means for securing said sleeves to said third plate, and a guide pin fixedly secured with respect to one of said first and third plates, to extend toward the other of said first and third plates, said other of said first and second plates having an aperture adapted to slidably receive said guide pin therethrough;
   wherein said pin includes means for limiting the separation between said one and said other plates when said male parts are closely aligned for insertion within said female parts; and
   wherein said other plate includes a slot intersecting said aperture and wherein said pin includes a transverse bar adapted to be received through said slot, and means for mounting said bar to said pin at an angle to said slot when said male parts are aligned for insertion within said female parts.

2. The invention as defined in claim 1 and further comprising means for manually displacing said third plate with respect to said second plate, 3. The invention as defined in claim 2 wherein said means for manually displacing comprises expanded end portions on said second and third plates extending outwardly beyond opposing ends of said first plate.

4. The invention as defined in claim 2 wherein said means for manually displacing comprises mechanically advantaged lever means for displacing said third plate with respect to said second plate.

5. The invention as defined in claim 4 wherein said lever means comprises;
   a guide pin mounted to one of said second and third plates, the other of said second and third plates having an aperture adapted to slidably receive said guide pin, means for resiliently urging said third plate away from said second plate, and cam means pivotally secured to said guide pin for restricting the separation between said third and second plates between a first position in which said sleeves are axially extended toward said second plate and a second position at which said sleeves are axially extended away from said second plate.

6. The invention as defined in claim 5 wherein said cam means comprises an elongated lever arm, and a cam body secured at one end of said lever arm and having a cam surface adapted to engage one of said second and third plates.

7. The invention as defined in claim 6 wherein said cam surface includes a first surface portion axially aligned with but perpendicular to said elongated lever arm and a second surface portion parallel to but spaced from said elongated lever arm and wherein said cam surface is radiused intermediate said first and second surface portions.

8. The invention as defined in claim 6 and further comprising means for limiting the separation between said first plate and said second and third plates when said male parts are closely aligned for insertion within said female parts.

9. The invention as defined in claim 6 and further comprising means for automatically displacing said first plate with respect to said second and third plates and automatically displacing said third plate with respect to said second plate.

10. The invention as defined in claim 9 wherein said means for automatically displacing comprises at least one working cylinder having a displaceable piston fixedly secured with respect to one of said first and second plates and a cylinder housing fixedly secured with respect to the other of said first and second plates.

11. The invention as defined in claim 9 wherein said means for automatically displacing comprises at least one working cylinder having its piston fixedly secured with respect to one of said second and said third plates and means for fixedly securing the cylinder housing with respect to the other of said second and third plates.

12. The invention as defined in claim 9 wherein said displacing means comprises a working cylinder having a housing defining a first and second piston chambers, a first piston having a first piston rod extending out of said first chamber, a second piston having a second piston rod extending out of said second piston chamber, wherein said housing is fixedly secured with respect to said second plate, said first piston rod is fixedly secured with respect to said first plate and said second piston rod is fixedly secured with respect to said third plate.

13. The invention as defined in claim 12 wherein one of said first and second rods is tubular and is coaxially aligned about the other of said first and second piston rods.

14. A fluid coupling comprising:
   a plurality of fluid connectors, each connector comprising a male part and a female part and means for selectively coupling said male part to said female part, said means for selectively coupling comprising a sleeve mounted for axial displacement along each of said female members;
   means for simultaneously displacing said sleeves comprising a first plate and means for securing said male parts to said first plate, a second plate and means for securing said female parts to said second plate for registration with said male parts in said first plate, and a third plate and means for securing said sleeves to said third plate; and means for automatically displacing said first plate with respect to said second and third plates and automatically displacing said third plate with respect to said second plate;

wherein said displacing means comprises a working cylinder having a housing defining first and second piston chambers, a first piston having a first piston rod extending out of said first chamber, and a second piston having a second piston rod extending out of said second piston chamber; wherein said housing is fixedly secured with respect to said second plate, said first piston rod is fixedly secured with respect to said first plate and said second piston rod is fixedly secured with respect to said third plate; and wherein one of said first and second rods is tubular and is coaxially aligned about the other of said first and second piston rods.

* * * * *